United States Patent
Sheikh et al.

(10) Patent No.: US 11,595,590 B1
(45) Date of Patent: Feb. 28, 2023

(54) METHOD FOR INTELLIGENT FRAME CAPTURE FOR HIGH-DYNAMIC RANGE IMAGES

(71) Applicant: Dell Products L.P., Round Rock, TX (US)

(72) Inventors: Shohrab Sheikh, Singapore (SG); Karthikeyan Krishnakumar, Austin, TX (US); Dengzhai Xiong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/582,085

(22) Filed: Jan. 24, 2022

(51) Int. Cl.
*H04N 5/235* (2006.01)
*H04N 5/232* (2006.01)

(52) U.S. Cl.
CPC ......... *H04N 5/2355* (2013.01); *H04N 5/2353* (2013.01); *H04N 5/23232* (2013.01)

(58) Field of Classification Search
CPC . H04N 5/2355; H04N 5/23232; H04N 5/2353
See application file for complete search history.

(56) References Cited

U.S. PATENT DOCUMENTS

| | | | | |
|---|---|---|---|---|
| 8,199,234 | B2* | 6/2012 | Seo | H04N 5/235 348/297 |
| 2004/0218830 | A1* | 11/2004 | Kang | H04N 5/2352 386/E5.069 |
| 2009/0213244 | A1* | 8/2009 | Seo | H04N 5/235 348/E5.034 |
| 2013/0093923 | A1* | 4/2013 | Imagawa | H04N 9/04559 348/239 |
| 2015/0092076 | A1* | 4/2015 | Campbell | H04N 5/374 348/222.1 |
| 2015/0296116 | A1* | 10/2015 | Tsuzuki | H04N 5/23254 348/208.1 |
| 2015/0334283 | A1* | 11/2015 | Vranceanu | H04N 9/0451 348/239 |
| 2016/0037043 | A1* | 2/2016 | Wang | H04N 5/2355 382/275 |

OTHER PUBLICATIONS

Wikipedia, "Multi-Exposure HDR Capture," downloaded from https://en.wikipedia.org/wiki/Multi-exposure_HDR_capture on Jan. 3, 2022, 14 pages.

* cited by examiner

*Primary Examiner* — Jason A Flohre
(74) *Attorney, Agent, or Firm* — Zagorin Cave LLP (57) ABSTRACT

A method for processing images by an information handling system includes receiving image data including first frames captured using a first exposure at a first frame rate and second frames captured using a second exposure at a second frame rate. The first frame rate is greater than the second frame rate. The method includes merging each second frame of the second frames with each first frame of a corresponding plurality of the first frames to generate a corresponding plurality of merged frames. Each merged frame of the corresponding plurality of merged frames may have a dynamic range of tonal values greater than each dynamic range of tonal values of each frame merged to form the merged frame.

19 Claims, 6 Drawing Sheets

METHOD FOR INTELLIGENT FRAME CAPTURE FOR HIGH-DYNAMIC RANGE IMAGES

BACKGROUND

Field of the Invention

The present invention relates in general to the field of portable information handling systems, and more particularly to an information handling system including a high-dynamic range imaging system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Recently, to deliver a smooth video output, an imaging subsystem of an information handling system needs both high resolution and a high frame rate. However, performance of the imaging subsystem is limited by the frames-per-second performance of available sensors, thus limiting high-dynamic-range (HDR) video performance. Conventional high-resolution sensors have a limited frame rate (e.g., low 30 frames per second (fps)) that limits high-dynamic-range video performance. Further, conventional algorithms capture consecutive frames at two different exposures and then superimpose consecutive frames to achieve high-dynamic-range performance specifications. That approach requires each frame to have two different exposure settings (e.g., a short exposure and a long exposure). Accordingly, improved frame capture for high-dynamic-range video delivery is desired.

SUMMARY OF EMBODIMENTS OF THE INVENTION

In at least one embodiment of the invention, an information handling system includes a raw image processor configured to provide image data including first frames captured using a first exposure at a first frame rate and second frames captured using a second exposure at a second frame rate. The first frame rate is greater than the second frame rate. The information handling system includes a high-dynamic-range image management processor configured to merge each second frame of the second frames with each first frame of a corresponding plurality of the first frames to generate a corresponding plurality of merged frames. Each merged frame of the corresponding plurality of merged frames may have a dynamic range of tonal values greater than each dynamic range of tonal values of each frame merged to form the merged frame.

In at least one embodiment, a method for processing images by an information handling system includes receiving image data including first frames captured using a first exposure at a first frame rate and second frames captured using a second exposure at a second frame rate. The first frame rate is greater than the second frame rate. The method includes merging each second frame of the second frames with each first frame of a corresponding plurality of the first frames to generate a corresponding plurality of merged frames. Each merged frame of the corresponding plurality of merged frames may have a dynamic range of tonal values greater than each dynamic range of tonal values of each frame merged to form the merged frame.

In at least one embodiment, a method for processing images by an information handling system includes capturing a first frame of image data by an image sensor using a first exposure. The method includes capturing a second frame of image data by the image sensor using a second exposure. The method includes determining a first frame rate for the first exposure and a second frame rate for the second exposure based on a comparison of a first image metric for a critical scene in the first frame of image data to a second image metric for the critical scene in the second frame of image data. The method may include receiving a sequence of image data including additional first frames received at the first frame rate interleaved with additional second frames received at the second frame rate. The method may include merging each first frame of a plurality of first frames captured using the first exposure with a corresponding second frame captured using the second exposure.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more busses operable to transmit communications between the various hardware components.

Figure 1:
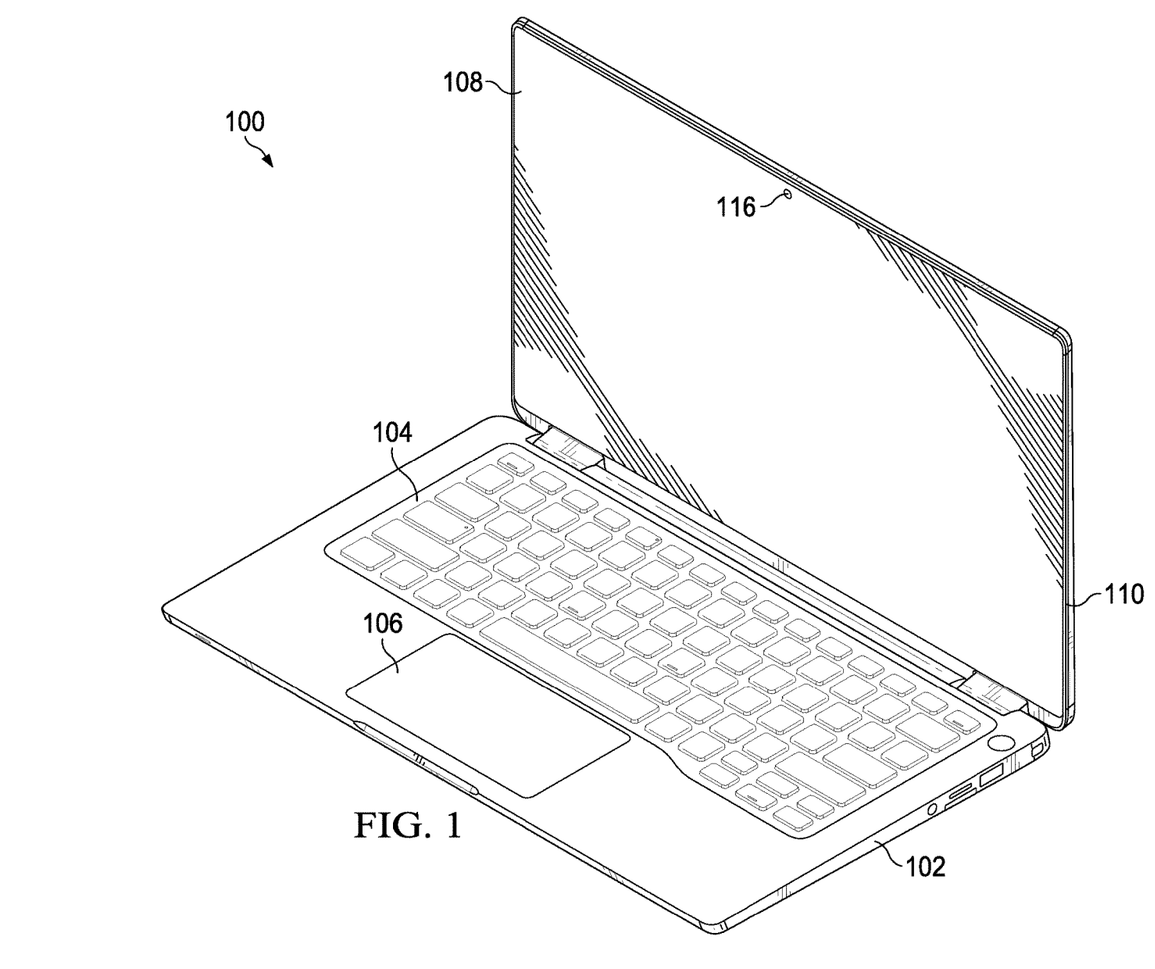
FIG. 1 illustrates a perspective view of an exemplary portable information handling system.

FIG. 1 illustrates an exemplary information handling system (e.g., laptop computing device, tablet computing device, or other portable information handling system) that includes an imaging subsystem (e.g., a webcam). During operation of information handling system 100, a variety of hardware and software elements cooperate to select and present user interfaces that enhance user interactions. In at least one embodiment, an operating system generally coordinates interactions with user devices, such as a keyboard, mouse, touchpad, or display. Outer housing of information handling system 100 includes lid housing portion 110 and base housing portion 102. Lid housing portion 110 includes display 108. In at least one embodiment, display 108 includes a touchscreen (e.g., capacitive touchscreen) user interface. Base housing portion 102 includes keyboard 104 and touch pad 106 of a user input subsystem. In one embodiment, rather than include keyboard 104 and touch pad 106, a second display (e.g., capacitive touchscreen) is included as the user input subsystem. In at least one embodiment, lid housing portion 110 includes camera 116 coupled to a video subsystem implementing frame capture for HDR imaging, although in other embodiments a camera is included externally or in base housing portion 102. In at least one embodiment, lid housing portion 110 includes camera 116 and at least portions of a video subsystem including a multi-frame image sensor, an image signal processor implementing frame capture for HDR imaging, and storage described below.

Figure 2:
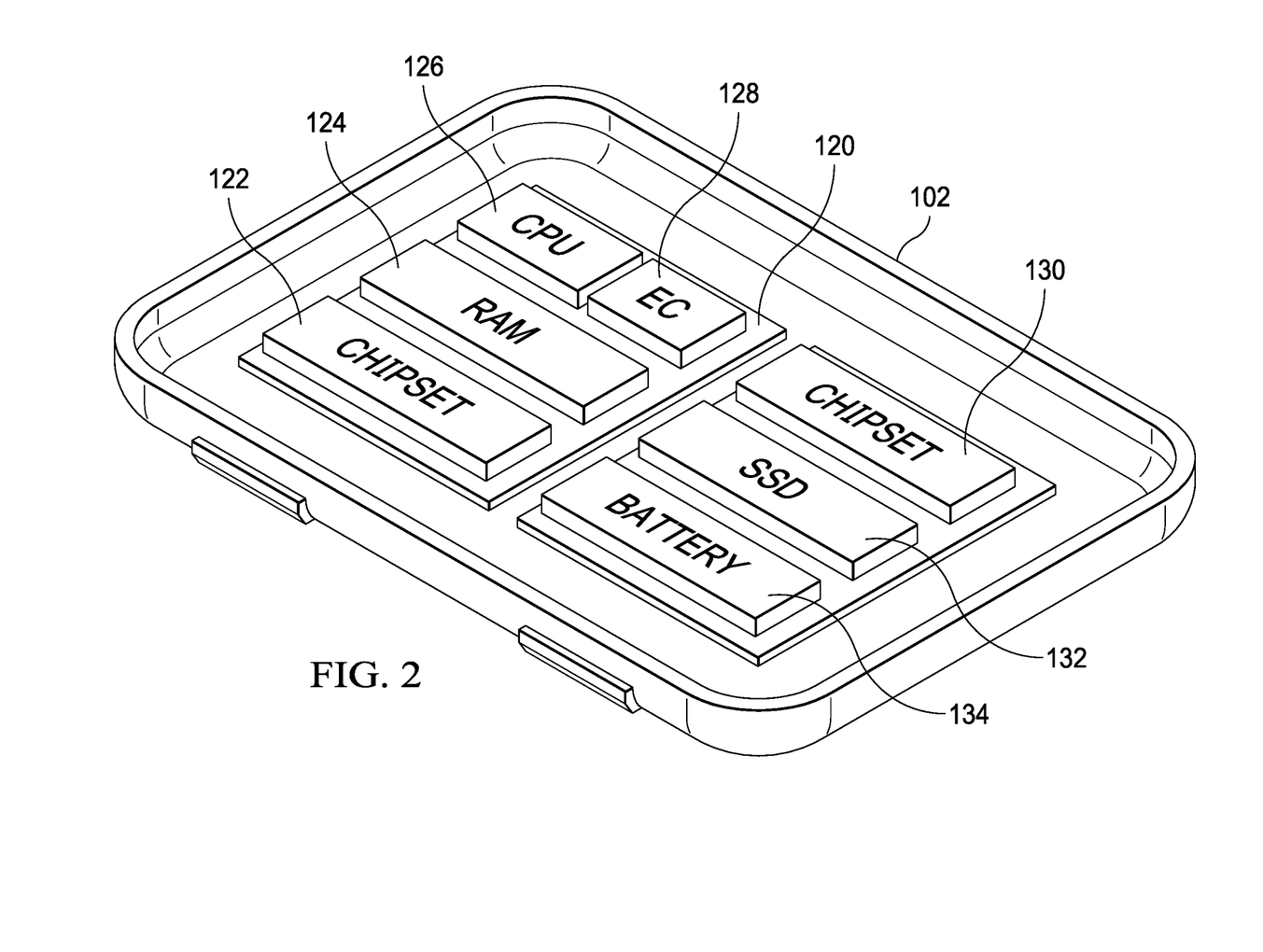
FIG. 2 illustrates an exemplary motherboard in an outer housing of a portable information handling system.

Referring to FIG. 2, in at least one embodiment of an information handling system, base housing portion 102 includes motherboard 120 supporting processing components that cooperate to process information. For example, central processing unit 126 executes instructions to process information stored in random-access memory (RAM) 124, such as instructions of an operating system and applications. Embedded controller 128 manages power and interactions with input/output devices and may include a portion of a video subsystem. Chipset 122 includes at least portions of a video subsystem including an image signal processor and storage described below. Chipset 130 manages operation of central processing unit 126, such as providing power, clock and memory access functions. In an exemplary embodiment, motherboard 120 fits into base housing portion 102 along with other components such as solid-state drive (SSD) 132 and battery 134 on motherboard 120 or on a separate board. In addition to the components depicted in the exemplary embodiment, other types of components may be included, such as to support graphics processing, wireless communication, or peripheral device interfaces.

Figure 3:
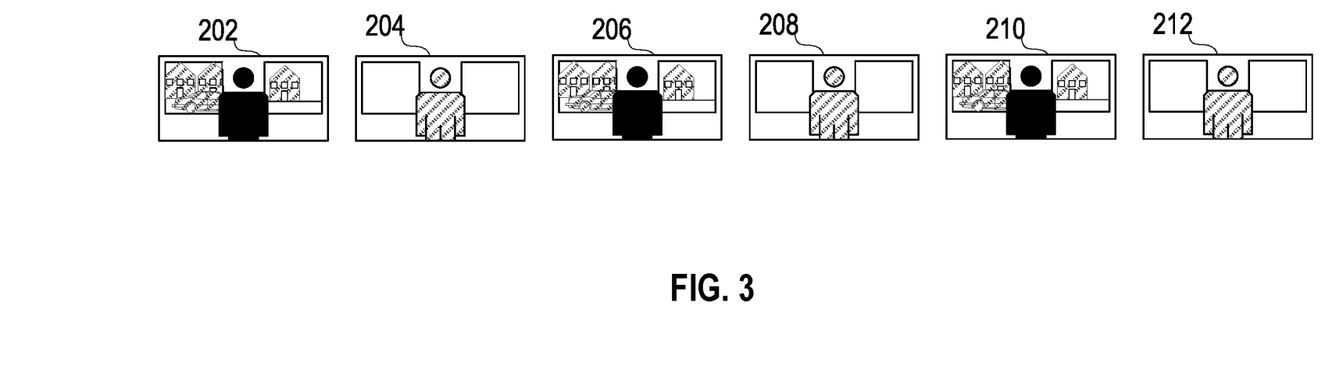
FIG. 3 illustrates exemplary frames of image data captured by an image sensor using multiple exposures.
Figure 4:
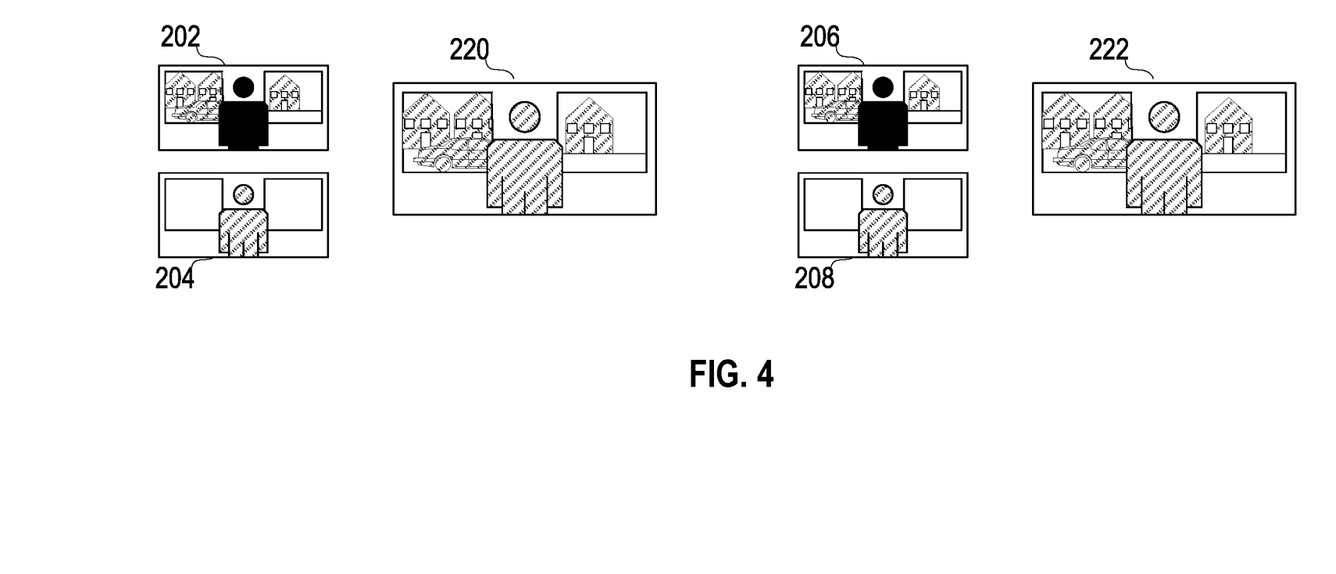
FIG. 4 illustrates exemplary frames of image data output by the image signal processor based on the exemplary frames of FIG. 3.

In at least one embodiment, information handling system 100 includes at least a portion of a video subsystem (e.g., a web camera) that captures frames of image data to provide HDR images. FIGS. 3 and 4 illustrate operation of a conventional HDR video subsystem. A multi-frame image sensor captures two frames of image data (e.g., a low exposure frame and a high exposure frame) at the same frame rate and provides the pair of frames to the image signal processor. In this example, the image of the person is the critical information. Since the person is standing in front of a bright background, a high exposure is needed to appropriately capture details of the person. The first exposure (e.g., low exposure) captures non-critical information with appropriate detail, and a suitable dynamic range of tonal values, as illustrated by the hatched car and houses viewed through the windows in the background in frames 202, 206, and 210. The second exposure (e.g., high exposure) captures the critical information with appropriate detail, and a suitable dynamic range, as illustrated by the hatched figure in frames 204, 208, and 212. Note that the order of the first fame as low exposure and the second frame as high exposure may change and the designation of the first frame as capturing non-critical information and the second frame as capturing critical information may also change according to the target subject. The video subsystem merges a low exposure frame captured with a corresponding high exposure frame (e.g., a next consecutive frame) to generate an output frame of image data, thereby providing output frames at 50% of the frame rate of the image sensor. The multi-frame image sensor captures frames 202, 206, and 210 at a first predetermined exposure and captures frames 204, 208, and 212 at a second predetermined exposure. The first predetermined exposure is shorter than the second predetermined exposure.

The video subsystem merges frame 202 and frame 204 to generate output frame 220 and merges frame 206 and frame 208 to generate output frame 222. If an exemplary image sensor has a native frame rate of 30 fps then the conventional HDR video subsystem provides output frames of HDR video at 15 fps. The output frame of image data (e.g., output frame 220) has a dynamic range of tonal data (i.e., luminance or radiance) that is greater than the dynamic range of each of the frames of image data (e.g., frame 202 and frame 204) that were merged to form the output frame of image data. Each tonal value indicates lightness of a corresponding pixel, i.e., how light or dark the corresponding pixel is on a scale of white to black independent of chromaticity (e.g., independently from hue and chroma).

In at least one embodiment, information handling system 100 includes an intelligent HDR video subsystem that captures multiple frames of image data (e.g., a low exposure frame and a high exposure frame) at different frame rates and provides the frames to the image signal processor, which generates output frames of HDR video at a higher frame rate than the conventional system described above using image sensors having the same frame rate. In at least one embodiment, a distribution of frames captured using long exposures and frames captured using short exposures is predetermined by a user configuration.

In at least one embodiment, a distribution of frames captured using long exposures and frames captured using short exposures is determined dynamically by the imaging subsystem. For example, after metering of the critical scene, the intelligent HDR video subsystem determines a distribution of long and short exposures (e.g., 2:1). The imaging subsystem may perform this analysis once at startup or continuously to provide dynamic updates periodically. The intelligent HDR video subsystem identifies an exposure setting that captures a frame of the critical scene with a metric (e.g., tonal value) having the greatest dynamic range. For example, the video subsystem performs exposure metering by adjusting the exposure time of the image sensor and measuring brightness of the critical scene (e.g., using spot metering, center-weighted, matrix/evaluative metering, or other metering technique). The image signal processor determines a first exposure for the critical scene in a frame of image data (e.g., a speaker in a video chat) and a second exposure for the non-critical scene in the frame of image data (e.g., background). In at least one embodiment, the image signal processor identifies whether a short exposure setting or a long exposure setting captures the critical scene with the highest dynamic range of tonal values. The image signal processor assigns a predetermined frame rate that is less than a native frame rate of the image sensor to the identified exposure setting and assigns a remainder of the native frame rate to at least one other exposure setting that is different from the predetermined frame rate and identified exposure setting.

Figure 5:
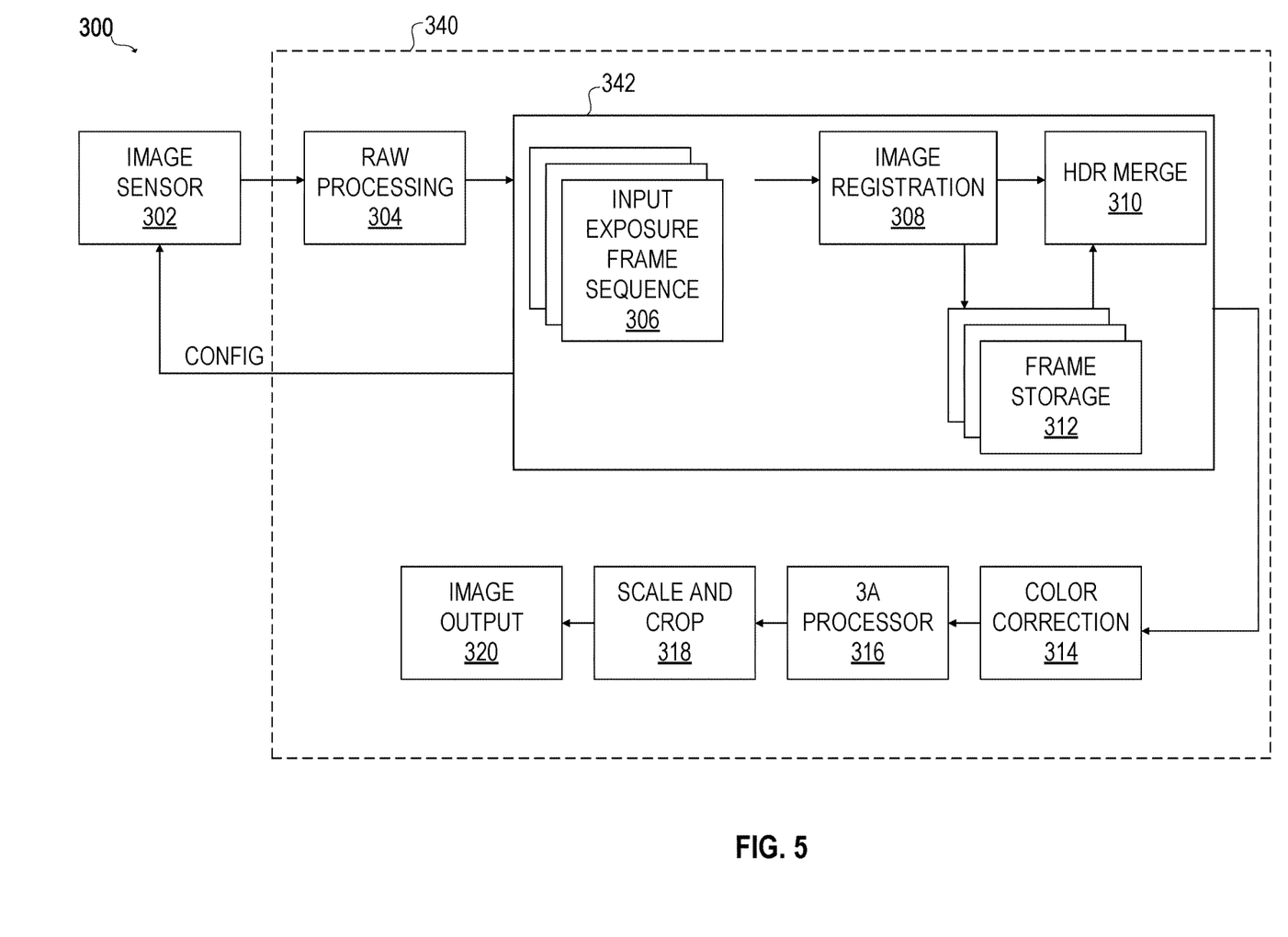
FIG. 5 illustrates a functional block diagram of an exemplary video subsystem consistent with at least one embodiment of the invention.

In an embodiment, digital imaging system 300 is a digital video device incorporated in a webcam application and is integrated within the information handling system of FIG. 1 for transmission of digital images over the Internet. Image signal processor 340 receives image data from image sensor 302. In at least one embodiment, image signal processor 340 includes HDR management controller 342 that configures image sensor 302 to have a first exposure setting at a first frame rate and a second exposure setting at a second frame rate. The first exposure setting is different from the second exposure setting and the first frame rate is different from the second frame rate. Raw image processor 304 receives unprocessed, raw images from image sensor 302 and analyzes the raw images to generating information associated with the corresponding frame. Raw image processor 304 provides image data and corresponding metrics (e.g., histogram of tonal information or histogram of peak luminance and dark areas of the scene) to HDR management controller 342.

In at least one embodiment, HDR management controller 342 receives input exposure frame sequence 306 including a plurality of frames of image data and corresponding metrics. Each frame of input exposure frame sequence 306 has a different exposure. For example, input exposure frame sequence 306 includes three frames of image data having exposure times of 15 ms, 20 ms, and 30 ms. HDR management controller 342 identifies pixels of the image including the critical scene (e.g., target subject) and pixels including the non-critical scene (e.g., background) and evaluates the corresponding image quality metrics (e.g., tonal values) to determine which of the plurality of exposures of input exposure frame sequence 306 provides the highest quality image of the critical scene. The highest quality image of the target subject is determined using objective image quality metrics corresponding to input exposure frame sequence 306. For example, in at least one embodiment, a prioritized exposure is selected towards the middle of the International Radio Engineers (IRE) scale exposure range to appropriately expose skin tones. In at least one embodiment, the image quality metrics include autoexposure histogram information, luminance, radiance, tone, contrast, brightness, white balance, dynamic range, other metrics, or combinations thereof for pixels identified as including the target subject.

Referring to FIG. 5, in general, the target subject in an exemplary webcam application is the user of the information handling system and is positioned in the foreground of the images received from image sensor 302. Non-critical information is included in the background of the images. HDR management controller 342 prioritizes the input exposure for critical information over input exposure(s) for non-critical information. In an embodiment, HDR management controller 342 determines the input exposure of the frame identified as having the highest quality image of the critical scene, identifies an input exposure for critical scene, identifies at least one other input exposure for the non-critical scene, and programs image sensor 302 accordingly.

For example, if the native frame rate of the image sensor is 45 fps, then HDR management controller 342 apportions 30 fps to the critical scene at the identified exposure setting. The remaining capability of image sensor 302 of the frame rate (e.g., 15 fps) is assigned to an exposure setting for the non-critical scene. HDR management controller 342 provides the corresponding frames of different exposures to image registration processor 308, which applies a translation to an image, as needed, to align scenes in the corresponding frames. HDR merge processor 310 combines the corresponding frames output by image registration processor 308 to increase the dynamic range of the output merged frame. HDR management controller 342 provides output merged frames for additional processing by image signal processor 340. For example, HDR management controller 342 provides a sequence of output merged frames to other subprocessors of image signal processor 340, e.g., color correction processor 314, 3A processor 316 (implements autofocus (AF), auto-exposure (AE), and auto-white balance (AWB) processing), and scale and crop processor 318, coupled in series to generate image output 320.

Figure 6:
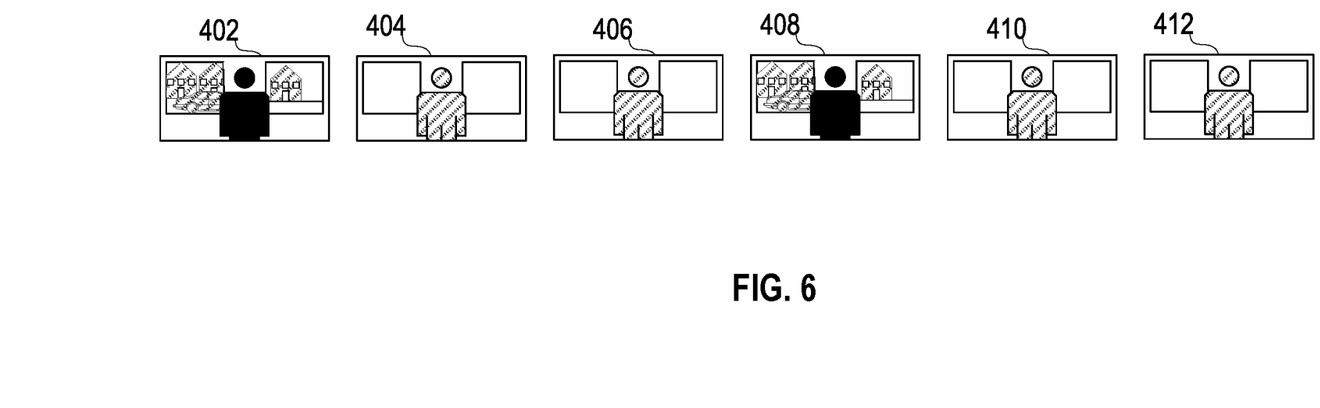
FIG. 6 illustrates exemplary frames of image data intelligently captured by an image sensor using multiple exposures consistent with at least one embodiment of the invention.
Figure 7:
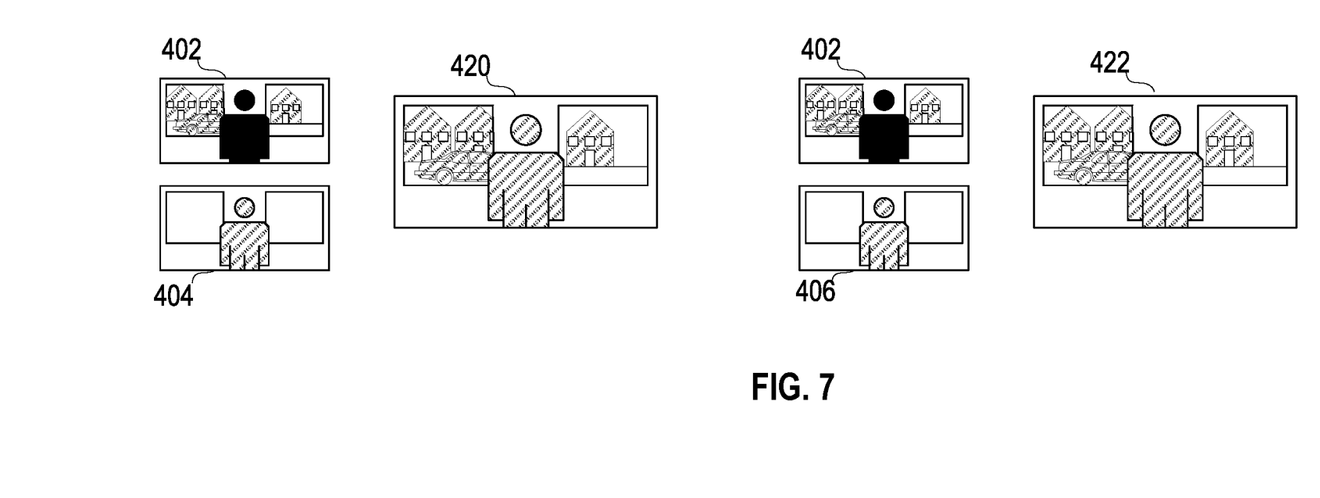
FIG. 7 illustrates exemplary frames of image data output by the image signal processor based on the exemplary frames of FIG. 6 consistent with at least one embodiment of the invention.

FIGS. 6 and 7 illustrate an exemplary sequence of frames of different exposures and the corresponding output of HDR merge processor 310. Frames 402 and 408 include images captured using a first exposure, e.g., a short exposure that captures the non-critical scene, and frames 404, 406, 410, and 412 include images captured using a second exposure, e.g., a long exposure that captures the critical information. The illustrated scene includes a subject speaker in the foreground and includes windows providing a view of a car and houses in the background. At the first exposure, the subject speaker is underexposed and has a low dynamic range, as illustrated by the solid black figure. The first exposure captures non-critical information with appropriate detail, and a suitable dynamic range of tonal values, as illustrated by the hatched car and houses viewed through the windows in the background. The second exposure captures the critical information with appropriate detail, and a suitable dynamic range, as illustrated by the hatched figure in frames 404, 406, 410, and 412. At the second exposure, the non-critical information is overexposed and has a low dynamic range, as illustrated by the solid white windows in the background. HDR management controller 342 prioritizes the second exposure (e.g., using a higher frame rate) and allocates ⅔ of the native sensor capability to the second exposure. Accordingly, a sequence of raw images includes one frame captured using the first exposure for every two frames captured using the second exposure.

Image signal processor 340 provides frame 402 to HDR merge processor 310 and saves frame 402 in frame storage 312. Image registration processor 308 provides frame 404 to HDR merge processor 310 for combination with frame 402 to generate output frame 420. Image registration processor 308 provides the next frame (e.g., frame 406), and the stored frame (e.g., frame 402) to HDR merge processor 310 for combination (e.g., to generate output frame 422), thereby reusing frame 402. Output frame 420 and output frame 422 have an increased dynamic range of tonal values as compared to the dynamic range of frames 402, 404, 406, 408, 410, and 412, and include the critical and non-critical information having appropriate detail at suitable exposures. Thus, two frames capture the critical information appropriately exposed for every frame including the non-critical information appropriately exposed. The technique reduces the native frame rate of the image sensor required to support a target high-dynamic-range video specification.

Figure 8:
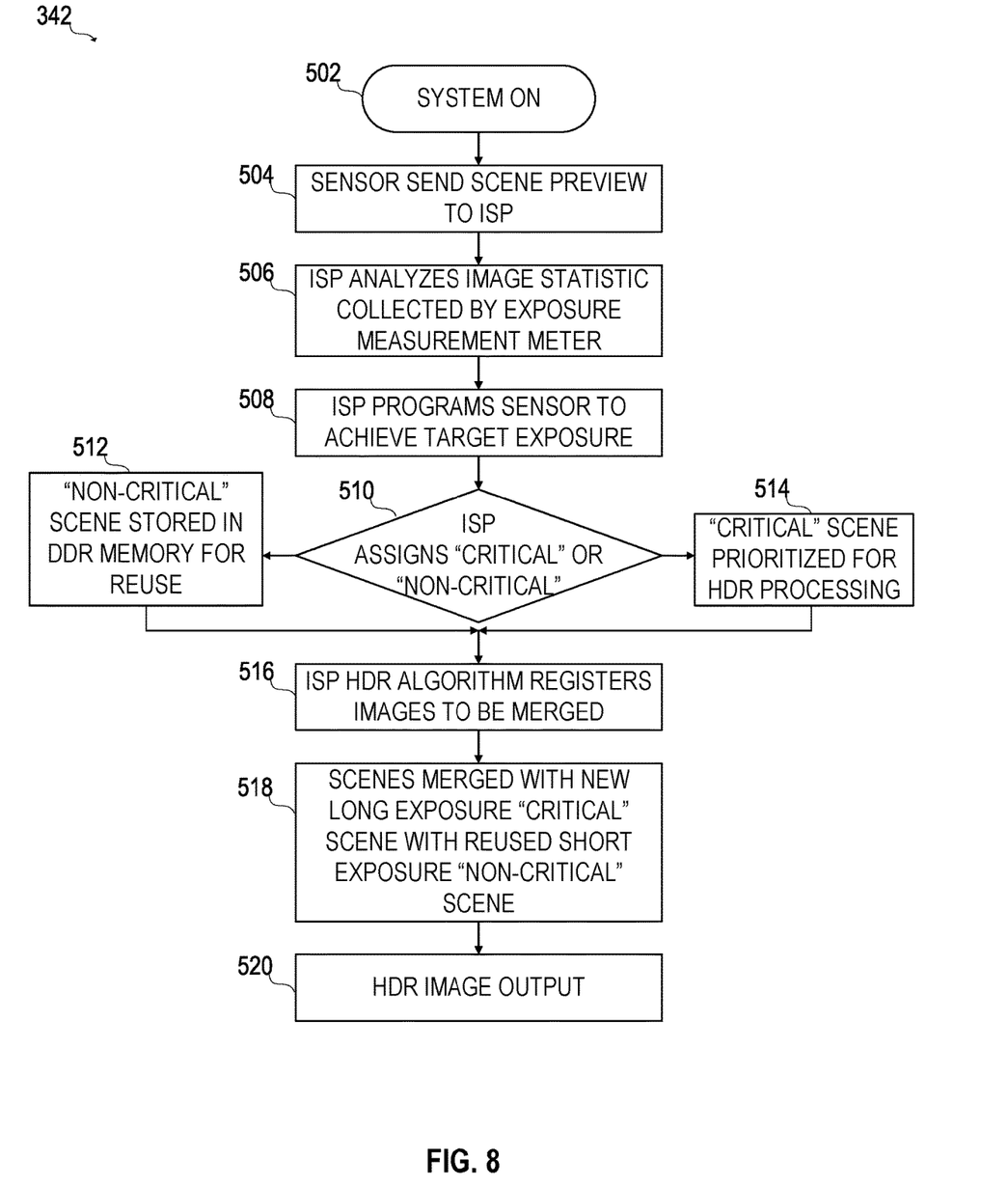
FIG. 8 illustrates an exemplary information and control flow for an image signal processor implementing intelligent frame capture consistent with at least one embodiment of the invention.

Referring to FIGS. 5 and 8, in at least one embodiment of an information handling system including digital imaging system 300, after powering-on digital imaging system 300 (502), image sensor 302 sends a scene preview to image signal processor 340 (504). Image signal processor 340 analyzes image statistics provided by an exposure measurement meter (506) and configures image sensor 302 to achieve a target exposure (508). For example, image signal processor 340 determines how much time to allocate to each of two frames captured by the image sensor during a multi-frame image capture process described above. In regular operation, image signal processor 340 receives a frame of image data and determines whether the frame exposes a critical scene with suitable detail or exposes a non-critical scene with suitable detail (510). In at least one embodiment, a host system specifies preferences for selecting the critical scene to image processor 340. In some embodiments, a user specifies the preferences to the host system manually or by automatic schemes. If the frame includes a critical scene with appropriate exposure and suitable detail, then image signal processor 340 prioritizes that frame for HDR processing by providing the frame to HDR merge processor 310 (514). If the frame includes a non-critical scene with appropriate exposure and suitable detail, then image signal processor 340 saves that frame in frame storage 312 for use in HDR merge processor 310 by a next frame including the critical scene with appropriate exposure (512). Image signal processor 340 registers scenes of two frames to be merged (516). HDR merge processor 310 merges a new long exposure critical scene with a short exposure non-critical scene that is stored for reuse with a next frame captured using a long exposure and appropriate exposure of the critical scene (518) and further processes the merged frame to provide an HDR image output (520).

Thus, techniques for intelligently capturing image data for HDR video have been disclosed. The description of the invention set forth herein is illustrative and is not intended to limit the scope of the invention as set forth in the following claims. For example, while the invention has been described in an embodiment in which a portable information handling system integrates the invention, one of skill in the art will appreciate that the teachings herein can be utilized in a product (e.g., a separate webcam product) that is external to the information handling system described above and coupled to the information handling system using a port. Although the invention is described with respect to embodiments including two distinct exposure settings and two distinct frame rates, in other embodiments, additional exposure settings and corresponding frame rates may be used.

Structures described herein may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium. The terms "first," "second," "third," and so forth, as used in the claims, unless otherwise clear by context, is to distinguish between different items in the claims and does not otherwise indicate or imply any order in time, location or quality. Variations and modifications of the embodiments disclosed herein may be made based on the description set forth herein, without departing from the scope of the invention as set forth in the following claims.

What is claimed is:

1. An information handling system comprising:
a raw image processor configured to provide image data including first frames captured using a first exposure at a first frame rate and second frames captured using a second exposure at a second frame rate, the first frame rate being greater than the second frame rate; and
a high-dynamic-range image management processor configured to merge each second frame of the second frames with each first frame of a corresponding plurality of the first frames to generate a corresponding plurality of merged frames,
wherein the high-dynamic-range image management processor is further configured to determine the first frame rate for the first exposure and the second frame rate for the second exposure based on a comparison of a first image metric for a critical scene in the first frames to a second image metric for the critical scene in the second frames.

2. The information handling system as recited in claim 1 wherein each merged frame of the corresponding plurality of merged frames has a dynamic range of tonal values greater than each dynamic range of tonal values of each frame merged to form the merged frame.

3. The information handling system as recited in claim 1 wherein the first image metric is a first dynamic range of tonal values of the critical scene in at least one of the first frames and the second image metric is a second dynamic range of tonal values of the critical scene in at least one of the second frames.

4. The information handling system as recited in claim 1 wherein the high-dynamic-range image management processor comprises:
   a storage element configured to store each of the second frames for processing with each of the corresponding plurality of the first frames; and
   a high-dynamic-range image merging unit configured to receive a stored second frame from the storage element and to merge the stored second frame with a next first frame of the corresponding plurality of the first frames.

5. The information handling system as recited in claim 1 further comprising:
   an image sensor configured to provide raw image data corresponding to the first frames captured using the first exposure at the first frame rate and the second frames captured using the second exposure and the second frame rate,
   wherein the second frame rate is a maximum frame rate of the image sensor minus the first frame rate.

6. The information handling system as recited in claim 5 wherein the first frame rate is at least 30 frames per second.

7. The information handling system as recited in claim 5, further comprising:
   an outer housing;
   a processor disposed in the outer housing, the processor being configured to execute instructions to process information;
   a memory disposed in the outer housing, the memory being configured to store the information; and
   the image sensor disposed in the outer housing and configured to capture the first frames at the first exposure and to capture the second frames at the second exposure.

8. The information handling system as recited in claim 7, wherein the high-dynamic-range image management processor is included in an image signal processor configured to execute instructions stored in the memory.

9. The information handling system as recited in claim 1, further comprising:
   an image signal processor comprising the raw image processor and the high-dynamic-range image management processor, the image signal processor being configured to apply color correction, auto-focus, auto-exposure, or auto-white balance processing to a sequence of image data provided by the high-dynamic-range image management processor.

10. The information handling system as recited in claim 1 wherein the high-dynamic-range image management processor comprises:
    a storage element; and
    a processor configured to execute instructions stored in the storage element, the instructions being executable by the processor to cause the processor to determine the first frame rate for the first exposure and the second frame rate for the second exposure.

11. A method for processing images by an information handling system, the method comprising:
    receiving image data including first frames captured using a first exposure at a first frame rate and second frames captured using a second exposure at a second frame rate, the first frame rate being greater than the second frame rate;
    determining the first frame rate for the first exposure and the second frame rate for the second exposure based on a comparison of a first image metric for a critical scene in one of the first frames to a second image metric for the critical scene in one of the second frames; and
    merging each of the second frames with each of a corresponding plurality of the first frames to generate a corresponding plurality of merged frames.

12. The method as recited in claim 11 wherein each merged frame of the corresponding plurality of merged frames has a dynamic range of tonal values greater than each dynamic range of tonal values of each frame merged to form the merged frame.

13. The method as recited in claim 11 wherein the second frame rate is a maximum frame rate of an image sensor minus the second frame rate.

14. The method as recited in claim 13 wherein the first frame rate is at least 30 frames per second.

15. The method as recited in claim 11 wherein the first image metric is a first dynamic range of tonal values of the critical scene in the one of the first frames and the second image metric is a second dynamic range of tonal values of the critical scene in the one of the second frames.

16. A method for processing images by an information handling system, the method comprising:
    receiving image data including first frames captured using a first exposure at a first frame rate and second frames captured using a second exposure at a second frame rate, the first frame rate being greater than the second frame rate;
    merging each of the second frames with each of a corresponding plurality of the first frames to generate a corresponding plurality of merged frames; and
    dynamically updating the first frame rate for the first exposure and the second frame rate for the second exposure using updated image data.

17. The method as recited in claim 16 further comprising:
    determining the first frame rate for the first exposure and the second frame rate for the second exposure based on a comparison of a first image metric for a critical scene in one of the first frames to a second image metric for the critical scene in one of the second frames.

18. The method as recited in claim 17 wherein the first image metric is a first dynamic range of tonal values of the critical scene in the one of the first frames and the second image metric is a second dynamic range of tonal values of the critical scene in the one of the second frames.

19. The method as recited in claim 16 wherein each merged frame of the corresponding plurality of merged frames has a dynamic range of tonal values greater than each dynamic range of tonal values of each frame merged to form the merged frame.

* * * * *